May 3, 1955  J. THOMSON ET AL  2,707,403
CONVEYOR DRIVING PULLEYS
Filed May 27, 1952
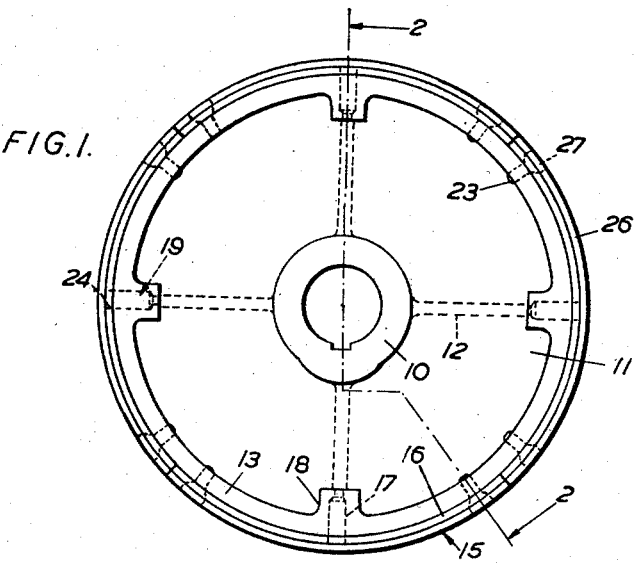
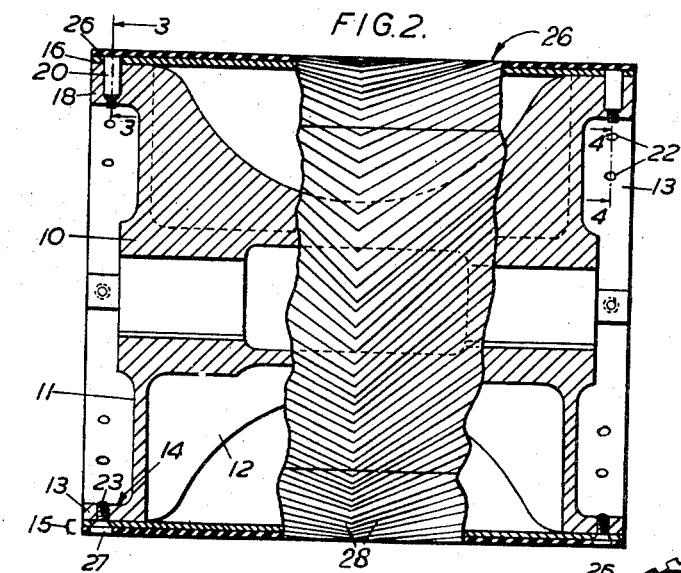
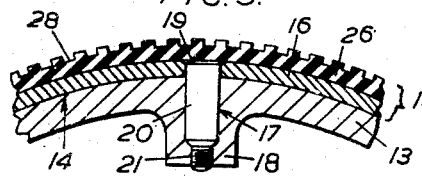
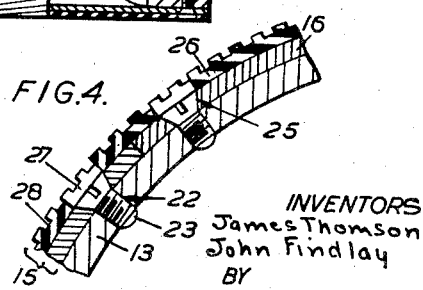
INVENTORS
James Thomson
John Findlay
BY
Richardson, David and Nordin
their ATTORNEYS

United States Patent Office 2,707,403
Patented May 3, 1955

2,707,403

CONVEYOR DRIVING PULLEYS

James Thomson and John Findlay, Glasgow, Scotland, assignors to Mavor & Coulson Limited, Glasgow, S. E., Great Britain Application May 27, 1952, Serial No. 290,268

3 Claims. (Cl. 74—230.7)

This invention relates to the driving rollers of endless belt conveyors, especially although not exclusively conveyors designed to work in coal mines.

It is customary to provide driving pulleys with lagging composed of rubber or technically equivalent material (hereinafter referred to as "rubber or rubber-like" material). Such pulleys as hitherto used are subject to certain disadvantages, especially when the rubber or rubberlike lagging becomes worn. For instance, the heads of the so-called fang bolts by which the rubber or rubberlike sheets are secured to the rim of the pulley in course of time project beyond the surface of the lagging and bite into the conveyor belt. Moreover, when the lagging becomes so badly worn that it must be removed and replaced, it is a difficult matter to manipulate the pulley, the bolts and the lagging in the constricted space available both as regards the removal of the worn lagging and the application of the new lagging.

The object of the present invention is to provide a kind of rubber or rubberlike lagging which will be generally an improvement and will be free from these disadvantages.

In accordance with the invention, an endless belt conveyor driving pulley has lagging which comprises arcuate metal plates, to the outer surface of which rubber or rubberlike material is bonded, the composite plates being secured end to end around a pulley core as a circular series providing a continuous circular driving surface.

The invention also comprises a segment for use in forming the driving surface of an endless belt conveyor driving pulley, the segment comprising an arcuate metal plate lagged with rubber or rubberlike material bonded to the outer surface of the metal.

The outer surface of the rubber or rubber-like material may be formed with surface roughening to render it more suitable for use under wet conditions; and the roughening may be got by serrating the surface with grooves, which may be inclined, for instance to form a herring-bone pattern, in order to discharge such fluid matter as may tend to accumulate on the lagging.

One embodiment of the invention will now be described by way of example with reference to the accompanying drawings, wherein;

Figure 1 is an end elevation of the pulley,
Figure 2 is a cross-section on the line 2—2 of Figure 1, partly in elevation,
Figure 3 is a detail sectional view on the line 3—3 of Figure 2, and
Figure 4 is a detail sectional view on the line 4—4 of Figure 2.

The core of the pulley consists of a casting comprising an axial boss 10 with solid discs 11 at opposite ends and with axial webs 12 to support the discs and also with peripheral annular flanges 13 extending outwardly endwise from the discs. The webs merge flush into the flanges but curve inwardly from them. The flanges provide terminal cylindrical surfaces 14 for the support of the composite segments 15. Each of these segments consists of an arcuate plate 16 subtending an angle of 90°, so that four of these segments when jointed end to end constitute a cylinder. Each of the flanges is formed with four equi-spaced radial holes 17 which are rather long, and extend into internal enlargements 18 provided for them in the flanges. The holes 17 are intended to receive driving pins 19 consisting of long heavy bodies 20 with screwed ends 21 (see Fig. 3). Each of the flanges is also formed with two other radial holes 22 which are equispaced in pairs on each side of the holes 17 and are adapted to receive set-screw pins 23 simply for securing the arcuate plate 16 to the flanges.

At each end of a segment, the arcuate plate has a central hole 24 to receive one of the driving pins 19 and two outer counter-sunk holes 25 to receive two of the set-screw pins 23. Each plate is lagged with rubber 26 which is bonded to the outer surface of the plate; that is to say, the rubber is securely united to the metal by vulcanization. Holes 27 are formed through the rubber in register with each of the countersunk holes 25 that are provided in the plate. The rubber is applied to the metal in a layer which is crowned; that is, the outer surface of the lagging when viewed in cross-section, is cambered so that the thickness of the rubber gradually increases from the ends of the pulley towards the middle of its length.

The rubber is formed with rectangular-section grooves 28 which incline in so-called "herring-bone" formation so that they resemble the teeth of double helical gearwheels. The grooves incline from the middle of the pulley's length in the direction away from the direction of rotation.

In the assembled pulley, the plates 16 are applied to the core casting in such a manner that they bear upon the peripheral surfaces 14 of the flanges 13 in proper positional relationship, this being assured by the driving pins 19 screwed into the holes 17 with the cylindrical bodies 20 of these pins fitting neatly into the corresponding holes 24 in the lagged plates and the pins coming flush (see Fig. 3) with the plates so that the rubber lies beyond the pins. The plates are secured to the core by screwing in the setscrew pins 23 the heads coming flush with the plate (see Fig. 4) thus leaving the rubber beyond the heads.

In use of the pulley, as the rubber becomes worn, the conveyor belt continues to run clear of the several pins until the final stage of wear of the rubber, so that the belt is saved from damage by the pins.

Moreover, in the work of re-lagging the pulley, the workers simply have to unscrew the set-screw pins 23 of each segment in turn, remove and replace the segment with a new one, and re-insert the set-screw pins. This work of replacement is simple in comparison with the re-lagging of the pulleys hitherto used.

The inclined grooves 28 serve to collect any fluid matter which may come upon the rubber lagging, and the action of the belt deforms the rubber "teeth" forming the grooves in such a way as to squeeze the matter towards the open ends of the grooves.

We claim:
1. An endless belt conveyor driving pulley comprising a core, peripheral annular flanges at the ends of said core, said flanges being formed with equi-spaced internal enlargements, arcuate metal plates disposed end to end around said core as a circular series providing a continuous circular driving surface, a layer of material selected from the class consisting of rubber and rubberlike material bonded to the outer surface of each of said arcuate metal plates, coincident holes being formed in said arcuate metal plates and in said layers bonded thereto and additional holes being formed in said arcuate metal plates, driving pins extending into said additional holes from said enlargements for positioning said arcuate metal plates on said core, and screws passed through said coincident holes and into said flanges for securing said arcuate metal plates thereto, said positioning pins and said securing screws coming flush with the outer surface of said metal plates.

2. A driving pulley as in claim 1 in which the outer surface of the layer of selected material on each of the arcuate metal plates is formed with grooves which are inclined to discharge such fluid matter as may tend to accumulate on said outer surface.

3. An endless belt conveyor driving pulley comprising a core, peripheral flanges at opposite ends of said core, arcuate metal plates disposed end to end around said core as a circular series providing a continuous circular driving surface, a layer of material selected from the class consisting of rubber and rubber-like material bonded to the outer surface of each of said arcuate metal plates, coincident holes being formed in said arcuate metal plates and in said layers bonded thereto and additional holes being formed in said arcuate metal plates, driving pins extending from said flanges into said additional holes for positioning said arcuate metal plates on said core, and screws passed through said coincident holes and into said flanges for securing said arcuate metal plates thereto, said securing screws and said driving pins extending from said flanges into said coincident holes and said additional holes, respectively, but not beyond the outer surface of said metal plates.

References Cited in the file of this patent

UNITED STATES PATENTS

| | | |
|---|---|---|
| 377,161 | Jebb | Jan. 31, 1888 |
| 802,617 | Whitcomb | Oct. 24, 1905 |
| 1,391,238 | Bried | Sept. 20, 1921 |
| 1,560,524 | Avery | Nov. 10, 1925 |
| 1,731,599 | Tannewitz | Oct. 15, 1929 |
| 1,803,357 | Robins | May 5, 1931 |
| 2,356,007 | Sanders | Aug. 15, 1944 |
| 2,578,622 | York | Dec. 11, 1951 |